United States Patent [19]
Leone

[11] Patent Number: 5,889,905
[45] Date of Patent: Mar. 30, 1999

[54] APPARATUS AND METHOD FOR MONITORING OPTICAL FIBERS

[75] Inventor: Frank Salvatore Leone, Berkeley Heights, N.J.

[73] Assignee: Lucent Technologies, Inc., Murray Hill, N.J.

[21] Appl. No.: 935,192

[22] Filed: Sep. 22, 1997

[51] Int. Cl.$^6$ ............................... G02B 6/32; G02B 6/00
[52] U.S. Cl. ............................................................. 385/25
[58] Field of Search ................................. 385/25, 26, 27, 385/31, 39, 147

[56] References Cited

U.S. PATENT DOCUMENTS

| | | | |
|---|---|---|---|
| 3,822,941 | 7/1974 | Mims | 228/1.1 |
| 5,019,780 | 5/1991 | Bailey | 324/457 |
| 5,155,329 | 10/1992 | Terada et al. | 219/121.63 |
| 5,258,615 | 11/1993 | Thorley | 250/227 |
| 5,309,907 | 5/1994 | Fang et al. | 600/342 |

Primary Examiner—Akm E. Ullah

[57] ABSTRACT

An optical apparatus that can be used to monitor and/or test targeted optical fibers. The apparatus is contained within a housing that is sized to fit within a shelf of the frame of a fiber administration system. Within the housing is a stationary plate having a face surface. Incoming optical fibers connect to connectors in an array on the side of the housing. The connector array interconnects the incoming optical fibers to a plurality of optical leads in the housing. The optical leads in the housing are optically coupled to target points on the face surface of the stationary plate. A motor is positioned across from the stationary plate. The motor selectively turns an armature that is attached to the shaft of the motor. A light receiving element is disposed on the armature, wherein the light receiving element optically aligns with each of the target points on the face surface of the stationary plate when moved by the motor. An electro-optical converter is optically coupled to the light receiving element on the armature. As the armature aligns the light receiving elements with the various target points on the face of the stationary plate, signals from the incoming optical fibers are optically connected to the electro-optical converter.

17 Claims, 1 Drawing Sheet

APPARATUS AND METHOD FOR MONITORING OPTICAL FIBERS

BACKGROUND OF THE INVENTION

1. Field of the Invention

The present invention relates to optical monitoring devices that monitor the quality of an optical signal passing through an optical cable. More particularly, the present invention relates to optical monitoring devices that monitor the quality of signals on multiple optical fibers using an optical switching mechanism and a single monitoring device.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, New Jersey, the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are optical couplings that receive the ends of all of the individual optical fibers that enter the central office and are contained within the optical fiber network. By terminating each optical fiber at a coupling on one of the different fiber distribution shelves, the location of each optical fiber becomes known within the overall assembly. Once terminated at a known address on one of the fiber distribution shelves, each optical fiber can be selectively coupled to a HDT or a variety of other pieces of optical equipment located at the central office.

Within the fiber administration system it is desirable to monitor the signal quality of optical signals in a variety of different optical fibers. In order to monitor such optical signals, the optical signals must be converted to electrical signals. The electrical signals can then be automatically monitored by a processor under computer control that uses statistical process control software. One problem associated with monitoring various optical signals in a fiber administration system is space. Fiber administration systems are modular in design, wherein different pieces of hardware are designed to fit within one of the shelves in the frame of the fiber administration system. The space dedicated to one shelf in a fiber administration system is small. This leaves little room for complex monitoring systems and numerous optical leads.

A need therefore exists for a optical fiber monitoring apparatus that is small enough to fit in a shelf of a fiber administration system, yet is capable of monitoring numerous optical fibers within that confined space.

SUMMARY OF THE INVENTION

The present invention is an optical apparatus that can be used to monitor and/or test targeted optical fibers. The apparatus is contained within a housing that is sized to fit within a shelf of the frame of a fiber administration system. Within the housing is a stationary plate having a face surface. Incoming optical fibers connect to connectors in an array on the housing. The connector array interconnects the incoming optical fibers to a plurality of optical leads in the housing. The optical leads in the housing are optically coupled to target points on the face surface of the stationary plate.

A motor is positioned across from the stationary plate. The motor selectively turns an armature that is attached to the shaft of the motor. A light receiving element is disposed on the armature, wherein the light receiving element optically aligns with each of the target points on the face surface of the stationary plate when moved by the motor.

An electro-optical converter is optically coupled to the light receiving element on the armature. As the armature aligns the light receiving elements with the various target points on the face of the stationary plate, signals from the incoming optical fibers are optically connected to the electro-optical converter. The electro-optical converter changes the optical signals to electrical signals that are monitored by a processor under computer control.

BRIEF DESCRIPTION OF THE DRAWINGS

For a better understanding of the present invention, reference is made to the following description of an exemplary embodiment thereof, considered in conjunction with the accompanying drawing, in which.

DETAILED DESCRIPTION OF THE DRAWINGS

Figure 1:
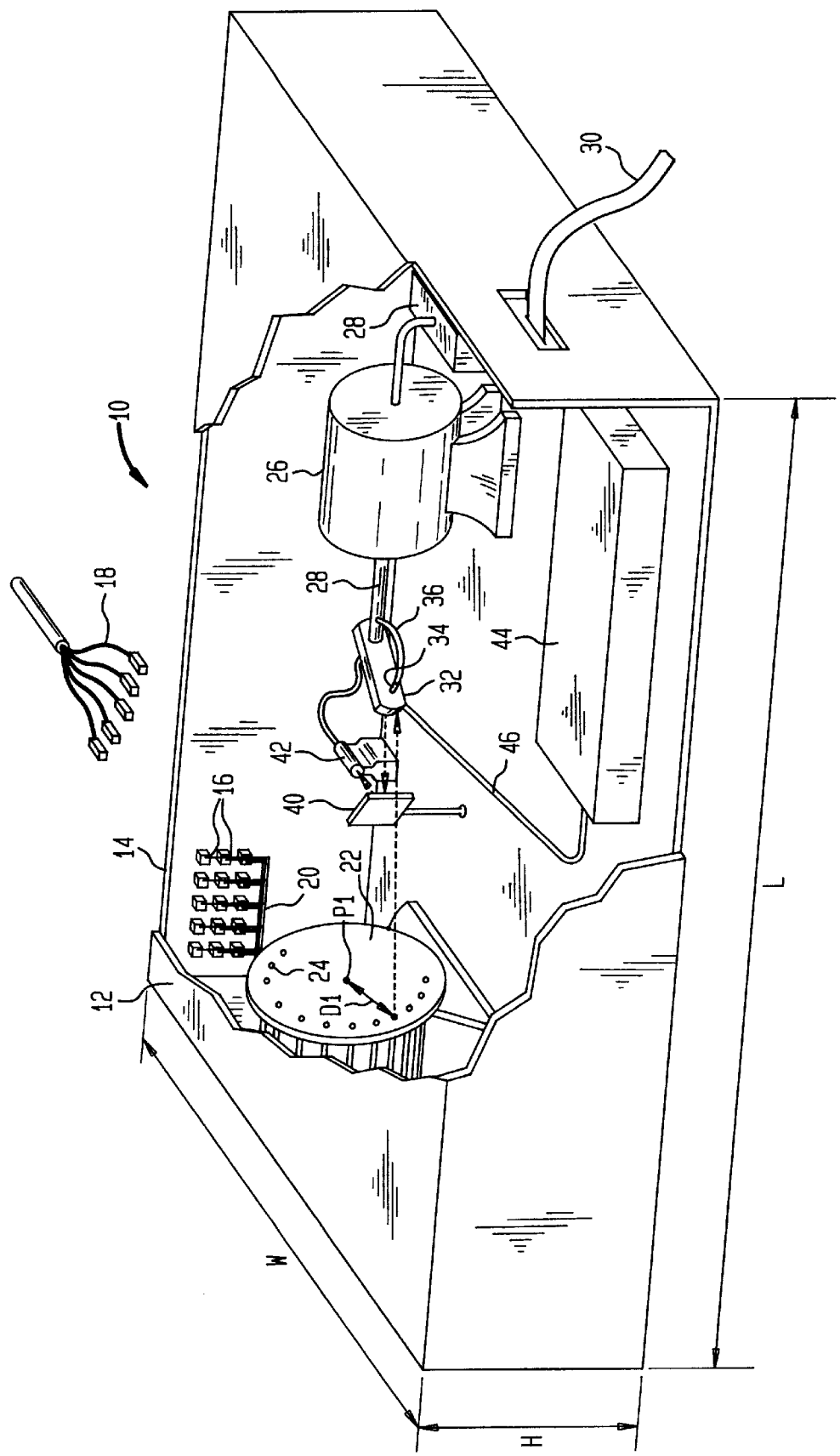
FIG. 1 is a fragmented perspective view of one preferred embodiment of the present invention optical fiber monitoring apparatus.

Although the present invention optical fiber monitoring apparatus can be used to test and/or monitor optical pathways in any optical system, the optical fiber monitoring apparatus is particularly well suited for monitoring optical signals from the confines of a shelf in a fiber administration system. Accordingly, by way of example, the present invention optical fiber monitoring apparatus will be described in an embodiment where the workings of the optical fiber monitoring apparatus are disposed in a shelf housing that is sized to fit onto a shelf in a fiber administration system.

In FIG. 1, the exemplary embodiment of a optical fiber monitoring apparatus 10 is shown. The optical fiber monitoring apparatus 10 is disposed in a shelf housing 12 having a length L, a width W and a height H. The shelf housing 12 is dimensioned to fit within the shelf space of the framework of a fiber administration system. Such administration systems are exemplified by the disclosures of U.S. patent application Ser. No. 08/645,108, entitled AN OPTICAL COMMUNICATIONS SYSTEM HAVING DISTRIBUTED INTELLIGENCE, filed May 13, 1996, and U.S. patent application No. 08/709,978A, entitled FIBER OPTIC OPERATION CENTER, filed Sep. 9, 1996, the disclosures of which are incorporated herein by reference.

On a wall 14 of the shelf housing 12 are disposed an array of optical connectors 16. The optical connectors 16 are designed to connect to external optical fibers 18 that emanate from other various optical taps in the fiber administration system. Within the shelf housing 12, optical leads 20 extend from the optical connectors 16 to a stationary plate 22. Each of the optical leads 16 terminates with a emitting lens element 24 that acts to collimate any light passing out of the optical leads 20.

The emitting lens elements 24 mount to the stationary plate 22. The emitting lens elements 24 are arranged in a circular pattern on the stationary plate 22, wherein each of the emitting lens elements 24 is the same distance D1 from a central point P1 on the stationary plate 22. The emitting lens elements 24 pass through apertures in the stationary plate 22. As such, light passing through the optical leads 20 will propagate through the emitting lens elements 24 and will pass through the stationary plate 22.

A controllable motor such as a stepper motor 26 is positioned in front of the stationary plate 22. The shaft 28 of the stepper motor 26 is hollow and is concentrically aligned with the central point P1 on the stationary plate 22. The stepper motor 26 is controlled by a motor driver 28 that receives control signals from an external controller via an input/output cable 30.

An armature 32 is coupled to the end of the hollow stepper motor shaft 28. The armature 32 extends at a perpendicular from the stepper motor shaft 28 and rotates with the stepper motor shaft 28. A receiving lens element 34 is positioned near the distal end of the armature 32. The distance between the receiving lens element 34 and the central axis of the hollow stepper motor shaft 28 is generally equal to the distance D1 between the emitting lens elements and the central point P1 on the stationary plate. An optical lead 36 is optically and physically connected to the receiving lens element 34. As a result, any light received by the receiving lens element 34 will be propagated into the optical lead 36. The optical lead 36 curves back and extends into the center of the hollow stepper motor shaft 28. The optical lead 36 terminates facing the stationary plate 22 in the same plane where it began on the face of the armature 32.

An optical reflector 40 is disposed in front of the stepper motor shaft 28 in between the shaft 28 and the stationary plate 22. The optical reflector 40 is optically aligned with the end of the optical lead 36 in the center of the stepper motor shaft 28. The optical reflector 40 directs any light emanating from the optical lead 36 to a light collecting lens 42. The light collecting lens 42 is coupled to an electro-optical converter 44 via a second optical lead 46. The electro-optical converter 44 converts any optical signals received through the optical lead into a corresponding electrical signal. The electrical signals produced by the electro-optical converter 44 are read by an external processor via the input/output cable 30.

Still referring to FIG. 1, the method of operation of the present invention optical fiber monitoring device 10 can be described. The incoming optical fibers 18 that are desired to be monitored are connected to the array of connectors 16 on the shelf housing 12. Signals received through the connector array from the incoming optical fibers 18 are propagated to the emitting lens elements 24 on the stationary plate 22, via the optical leads 20. As a result, each of the emitting lens elements 24 on the stationary plate 22 is emitting an optical signal that corresponds to one carried by one of the incoming optical fibers 18 that is to be monitored.

An external processor determines which of the incoming optical fibers 18 is to be monitored. Any one specific incoming optical fiber can be monitored, or a scanning pattern can be used to repeatedly monitor all of the incoming optical fibers 18. The external processor instructs the motor driver 28 to activate the stepper motor 26 and cause the stepper motor 26 to move the armature 32 to a predetermined position. As the armature 32 rotates with the shaft 28 of the stepper motor 26, the receiving lens element 34 on the armature 32 optically aligns with the different emitting lens elements 24 on the stationary plate 22. Depending upon how the stepper motor 26 is instructed, the armature 32 can be moved so that the receiving lens element 34 is optically aligned with any of the emitting lens elements 24.

Once aligned, an optical signal emitted through a targeted emitting lens element 24 is received by the receiving lens element 34 on the armature 32. The received signal is propagated through the curved optical lead 36 and is again emitted long the longitudinal axis of the stepper motor shaft 28. The optical signal travels toward the optical reflector 40, wherein the optical reflector 40 directs the optical signal to a light collecting lens 42. The light collecting lens 42 feeds the optical signal to the second optical lead 46 that extends to the electro-optical converter 44. The electro-optical converter 44 changes the optical signal to an electrical signal that can be monitored by the central processor of the fiber administration system.

To monitor a different incoming optical fiber 18, the stepper motor 26 is operated and the armature 32 is turned until the receiving lens element 34 on the armature 32 optically aligns with the emitting lens element 24 coupled to the targeted incoming optical fiber 18. To monitor all of the incoming optical fibers 18, the stepper motor 26 periodically moves the armature 32 back and forth across all the positions that align the emitting lens elements 24 with the receiving lens element 34.

From the description of the optical monitoring apparatus already provided, it will be understood that the apparatus can also be used as an optical switch that interconnects a piece of test equipment to the various incoming optical fibers 18. In such an application, the electro-optical converter 44 is bypassed. An optical signal from a piece of test equipment (not shown) is fed into the second optical lead 46. That test signal is reflected by the optical reflector 40 and received by the end of the optical lead 36 in the center of the motor shaft 28. The test signal propagates through the optical lead 36 and is emitted by the lens element 34 at the end of the armature 32. The test signal can then be selectively directed to one of the lens elements 24 in the stationary plate 22 by moving the armature 32. The test signal is thereby selectively directed to any one of the incoming optical fibers 18.

It should also be understood that two armatures can be affixed to the shaft of the motor, with the use of two armatures both monitoring and testing can be performed at the same time in the manners previously described.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An apparatus, comprising:

a stationary plate having a face surface;

a plurality of optical fibers optically coupled to points on said face surface of said stationary plate;

a motor;

an armature selectively positionable by said motor within a predetermined range;

a light receiving element disposed on said armature, wherein said light receiving element optically aligns with each of said points on said face surface of said stationary plate when moved across said predetermined range by said motor; and an electro-optical converter optically coupled to said light receiving element.

2. The apparatus according to claim 1, wherein said points on said face surface of said stationary plate are all a predetermined distance from a common point on said face surface.

3. The apparatus according to claim 2, wherein said motor has a shaft that is turned by said motor and said armature extends outwardly from said shaft.

4. The apparatus according to claim 3, wherein said light receiving element is a fixed distance from the center of said shaft and said fixed distance is generally equal to said predetermined distance on said stationary plate.

5. The apparatus according to 1, further including a first optical lead having a first end coupled to said light receiving element and a second end positioned in the center of said shaft, whereby light signals received by said light receiving element propagate through said first optical lead to the center of said shaft.

6. The apparatus according to claim 5, wherein an optical reflector is optically aligned with said second end of said first optical lead.

7. The apparatus according to claim 6, wherein a second optical lead is optically aligned with said optical reflector and said reflector reflects light emanating from said second end of said first optical lead to said second optical lead.

8. The apparatus according to claim 7, wherein said second optical lead is coupled to said electro-optical converter.

9. The apparatus according to claim 1, further including an array of optical connectors, wherein said optical leads optically connect said optical connectors to said points on said face surface of said stationary plate.

10. A method of selectively converting an optical signal from one of a plurality of optical fibers into a corresponding electrical signal, comprising the steps of:

optically connecting said plurality of optical fibers to different points on a stationary plate;

positioning a light receiving element on an armature, wherein said light receiving element is optically coupled to an electro-optical converter;

selectively moving said armature along a predetermined path, wherein said light receiving element optically aligns with each of said plurality of optical fibers at said different points while moving along said predetermined path.

11. The method according to claim 10, wherein said points on said stationary plate are all a predetermined distance from a common point on said stationary plate.

12. The method according to claim 11, wherein said step of selectively moving said armature along a predetermined path includes coupling said armature to a shaft of a stepper motor.

13. The method according to claim 12, wherein said light receiving element is a fixed distance from the center of said shaft and said fixed distance is generally equal to said predetermined distance on said stationary plate.

14. The method according to claim 12, further including the step of connecting an first optical lead to said light receiving element wherein one end of said first optical lead is connected to said light receiving element and the opposite end of said first optical lead extends into said shaft of said stepper motor, whereby light signals received by said light receiving element propagate through said first optical lead to the center of said shaft.

15. The method according to claim 14, further including the step of optically aligning an optical reflector with said second end of said first optical lead.

16. The method according to claim 15, further including the step of optically aligning a second optical lead with said optical reflector, whereby said optical reflector reflects light emanating from said second end of said first optical lead to said second optical lead.

17. The method according to claim 16, wherein said second optical lead is coupled to said electro-optical converter.

* * * * *